United States Patent [19]
Nelson et al.

[11] Patent Number: 6,148,004
[45] Date of Patent: Nov. 14, 2000

[54] METHOD AND APPARATUS FOR ESTABLISHMENT OF DYNAMIC ESCON CONNECTIONS FROM FIBRE CHANNEL FRAMES

[75] Inventors: Jeffrey J. Nelson, Louisville, Colo.; Robert Hale Grant, Toronto, Canada

[73] Assignee: McData Corporation, Broomfield, Colo.

[21] Appl. No.: 09/021,365

[22] Filed: Feb. 11, 1998

[51] Int. Cl.[7] ............................. H04L 12/66; H04J 3/02
[52] U.S. Cl. .......................................... 370/463; 370/537
[58] Field of Search ........................ 370/352, 353, 370/356, 357, 359, 392, 394, 395, 401, 412, 413, 419, 428, 437, 461, 463, 465, 474, 537, 431, 536, 540

[56] References Cited

U.S. PATENT DOCUMENTS

| | | | |
|---|---|---|---|
| 5,107,489 | 4/1992 | Brown et al. | 370/58.2 |
| 5,423,026 | 6/1995 | Cook et al. . | |
| 5,436,893 | 7/1995 | Barnett | 370/392 |
| 5,490,007 | 2/1996 | Bennett et al. | 359/139 |
| 5,535,373 | 7/1996 | Olnowich | 370/466 |
| 5,546,549 | 8/1996 | Barrett et al. | 395/309 |
| 5,602,841 | 2/1997 | Lebizay et al. | 370/413 |
| 5,638,518 | 6/1997 | Malladi | 709/251 |
| 5,689,506 | 11/1997 | Chiussi et al. | 370/412 |
| 5,699,532 | 12/1997 | Barrett et al. . | |
| 5,765,032 | 6/1998 | Valizadeh | 370/413 |
| 5,793,983 | 8/1998 | Albert et al. . | |
| 5,805,924 | 9/1998 | Stoevhase | 370/254 |
| 5,894,481 | 4/1999 | Book | 370/412 |

OTHER PUBLICATIONS

"ESCON Director Model 4 (9033) for ESCON Architecture," International Business Machines Corporation, Fishkill, New York, Dec. 1995.
McDATA Corporation, *Information is the Lifeblood of Your Success. Fibre Channel Switching is the Pulse*, 1997.
McDATA Corporation, LinkMaster 9191 ESCON Multiport Repeater, 1993, 1994.
IBM, ESCON Director Model 3, 1994.
Fibre Channel Association, *Fibre Channel Quick Reference Card*, 1997.

*Primary Examiner*—Chau Nguyen
*Assistant Examiner*—Chiho Andrew Lee
*Attorney, Agent, or Firm*—Stuart T. Langley; William J. Kubida; Richard A. Bachand

[57] ABSTRACT

A method and apparatus for the establishment of dynamic Enterprise System Connection ("ESCON") connections over a Fibre Channel connection allows a port state machine (or port module) to request dynamic ESCON connections from the exchange context of the Fibre Channel frame and to implement dynamic linking of the Fibre Channel exchanges to ESCON ports while also linking and monitoring the status of these connections for all subsequent frames associated on a particular exchange. In a particular embodiment, the method and apparatus provides the ability to establish dynamic connections through an ESCON Director switch based off of the Originator Exchange Identifier ("OX_ID") of the FC-2 header and information contained in the FC-4 header of the Fibre Channel frame. Once a connection path has been established for a particular OX_ID, that connection is maintained until the exchange is terminated.

11 Claims, 4 Drawing Sheets

METHOD AND APPARATUS FOR ESTABLISHMENT OF DYNAMIC ESCON CONNECTIONS FROM FIBRE CHANNEL FRAMES

BACKGROUND OF THE INVENTION

The present invention relates, in general, to the field of Enterprise System Connection (ESCON™ is a trademark of International Business Machines Corporation, "IBM") switches. More particularly, the present invention relates to a method and apparatus for the establishment of dynamic ESCON connections from Fibre Channel frames.

A typical ESCON switch is described in U.S. Pat. No. 5,107,489 issued Apr. 21, 1992 for "Switch and its Protocol for Making Dynamic Connections", the disclosure of which is herein specifically incorporated by this reference. Among the switches which are commercially available are the IBM ESCON Director Models 3, 4 and 5 developed in conjunction with McDATA Corporation, Broomfield, Colorado, assignee of the present invention. An ESCON connection has a bandwidth of 20 Mbytes/sec. in a half duplex mode of operation.

On the other hand, Fibre Channel is an integrated set of standards adopted by the American National Standards Institute ("ANSI") which defines protocols for information transfer. The Fibre Channel has a bandwidth of approximately 200 Mbytes/sec. (212 Mbytes/sec.) in full duplex mode of operation (i.e. 106 Mbytes/sec. in each of transmit and receive modes of operation). Information transfer occurs in indivisible units called "frames". Fibre Channel devices are called "nodes", each of which has at least one "port" for access to other ports of other nodes. Currently, fibre channel includes five defined functional levels:

FC-0 defines the physical portions inclusive of media types, connectors and the electrical and optical characteristics needed to connect ports.

FC-1 defines the transmission protocol, including the encoding, order of word transmission and error detection;

FC-2 defines the signaling and framing protocol inclusive of frame layout, frame header content and rules for use;

FC-3 defines common services that may be available across multiple ports in a node; and FC-4 defines the mapping between the lower levels of Fibre Channel and the command sets that use it, inclusive of the Small Computer System Interface ("SCSI"), Intelligent Peripheral Interface ("IPI"), High Performance Parallel Interface ("HIPPI") and the like.

As previously mentioned, the standard ESCON connection has a bandwidth of 20 Mbytes/second and is half-duplex in operation (i.e. either a "read" or "write" command can be active at one time) while Fibre Channel can provide up to 212 Mbytes/second (106 Mbytes/second in both transmit and receive) at full duplex. It would, therefore, be highly desirable to be able to multiplex multiple ESCON channels over a single Fibre Channel connection to take advantage of the latter's much higher relative bandwidth.

SUMMARY OF THE INVENTION

The method and apparatus of the present invention advantageously allows a Fibre Channel port state machine (or port module) to request dynamic ESCON connections from the exchange context of the Fibre Channel frame and to implement dynamic linking of Fibre Channel exchanges to ESCON ports. The port level state machine also links and monitors the status of these connections for all subsequent frames associated for the duration of a particular exchange until exchange termination.

In a particular embodiment disclosed herein, the present invention provides the ability to establish dynamic connections through an ESCON Director switch based off of the Originator Exchange Identifier ("OX_ID") of the FC-2 header and information contained in the FC-4 header of the Fibre Channel frame. Once a connection path has been established for a particular OX_ID, the method and apparatus of the present invention maintains that connection until the exchange is terminated.

The present invention is of particular utility in allowing ESCON traffic (Fibre Channel FC-4 type) to be transported and multiplexed with standard Fibre Channel functionality equivalent to that of eight conventional ESCON channels. The method and apparatus of the present invention allows for connections to native ESCON devices to be established throughout an ESCON Director switch and the multiplexing of these connections through the use of Fibre Channel frames and sequences.

Particularly disclosed herein is a method for multiplexing a plurality of first data channels over a second data channel. The method comprises the steps of indicating a start up exchange for a first of a plurality of data frames on the second data channel, directing the first of the plurality of data frames from the second data channel to a specified one of the first data channels and also directing all subsequent ones of the plurality of data frames to the specified one of the first data channels.

Also disclosed herein is a port module which comprises a plurality of link controllers, each of the link controllers coupled to one of a plurality of data ports; a plurality of buffer memories, each of the buffer memories associated with each of the link controllers; a data channel; and a front end portion of the port module coupled to the data channel and operative in association with a matrix controller for identifying a start up exchange for a first of a plurality of data frames on the data channel. The front end portion directs the first of the plurality of data frames to a first portion of the plurality of buffer memories and all subsequent ones of the plurality of data frames to a second portion of one of said plurality of buffer memories associated with one of the link controllers associated with a selected one of the plurality of data ports specified by the matrix controller.

In a more particular embodiment of the present invention, a method is disclosed for establishing dynamic ESCON connections over a Fibre Channel connection. The method comprises the steps of: receiving a series of Fibre Channel data frames on the Fibre Channel connection, checking each of the series of data frames for a status of an Originator Exchange Identifier and linking the Originator Exchange Identifier to a selected one of a plurality of link controllers each coupled to one of the ESCON connections. The data frame is then passed to the selected one of the plurality of link controllers if the status of the Originator Exchange Identifier of a first of the series of data frames is in an inactive state thereof and the state of said Originator Exchange Identifier is changed to an "active" state thereof. Each of the series of data frames having a corresponding Originator Exchange Identifier is passed to the selected one of the plurality of link controllers while the status of the Originator Exchange Identifier is in the "active" state thereof and the state of said Originator Exchange Identifier is re-changed to the inactive state thereof upon receipt of a last of the series of data frames having the corresponding Originator Exchange Identifier.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
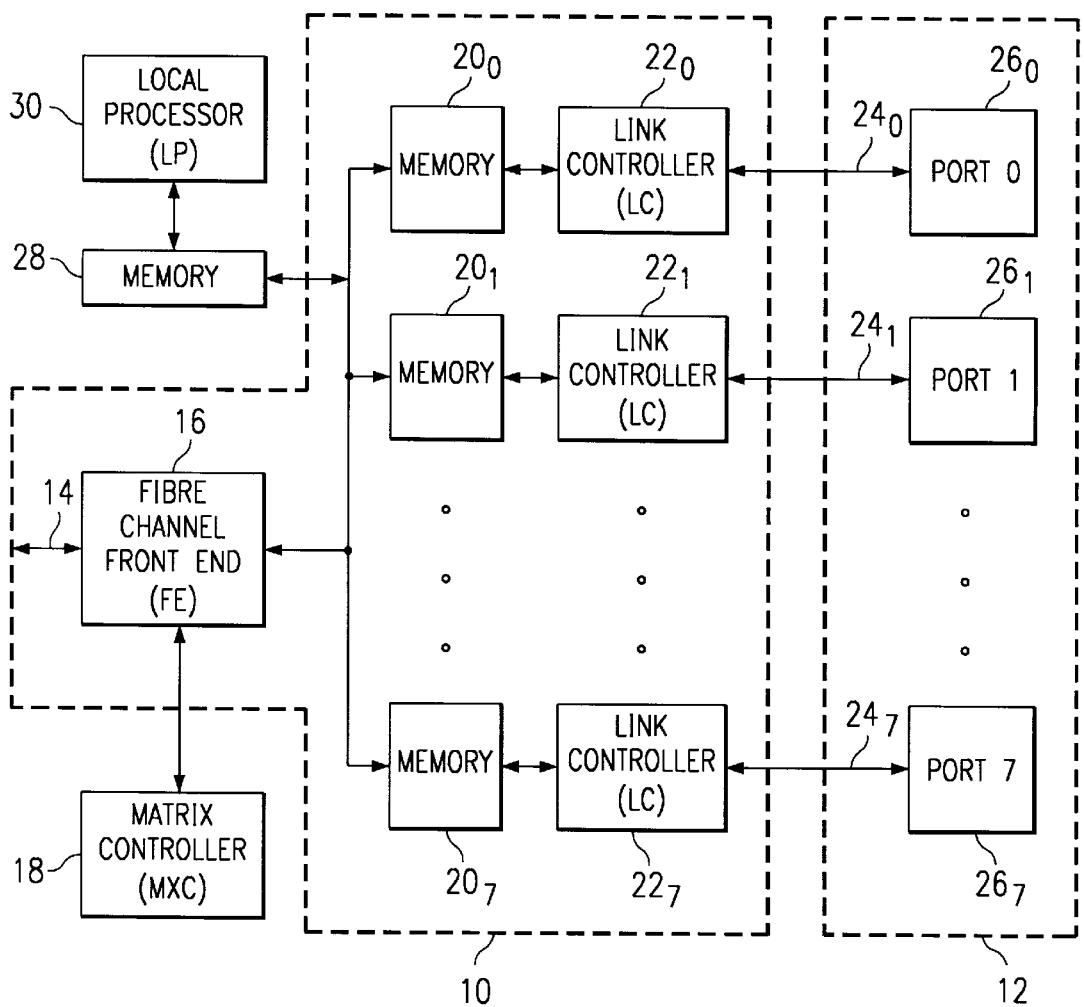
FIG. 1 is a functional block diagram of a port module in accordance with a specific embodiment of the present invention for the establishment of dynamic ESCON connections from Fibre Channel frames illustrated in conjunction with a conventional eight port module of an ESCON Director point-to-point switch.

With reference now to FIG. 1, a port module 10 for the establishment of dynamic ESCON connections from Fibre Channel frames is shown. The port module 10 is utilized in conjunction with a conventional ESCON point-to-point switch 12 such as the IBM Director series Models 3,4, and 5 manufactured by McDATA Corporation, Broomfield, CO.

The port module 10 receives data frames on a Fibre Channel ("FC") bus 14 which is bidirectionally coupled to a Fibre Channel front end 16. As mentioned previously, the Fibre Channel bus 14 has a bandwidth of approximately 200 Mbytes/sec. in full duplex mode (100 Mbytes/sec. for transmission and 100 Mbytes/sec. for reception). The Fibre Channel front end ("FE") 16 operates in accordance with instructions received from a matrix controller ("MXC") 18 which specifies which of the link controllers $22_0$ through $22_7$ to which to direct a frame based upon the Originator Exchange Identifier ("OX_ID"). In a preferred embodiment, the matrix controller 18 may be furnished in a form as described and claimed in co-pending U.S. patent application Ser. No.: 08/942,506 filed Oct. 2, 1997 for: "Method and Apparatus for Implementing Hunt Group Support for a Crosspoint Controller", assigned to McDATA Corporation, the disclosure of which is herein specifically incorporated by this reference. Once a "bind" has been established to a particular one of the link controllers $22_0$ through $22_7$, all subsequent frames with the same exchange identifier are automatically routed to the correct link controller 22 by the Fibre Channel front end 16 as will be more fully described hereinafter.

The port module 10 further comprises a plurality of memory buffers $20_0$ through $20_7$ each associated with a separate ESCON engine (or link controller "LC") $22_0$ through $22_7$ respectively. The link controllers 22 function to convert Fibre Channel sequences into ESCON frames and vice versa. The link controllers $22_0$ through $22_7$ are individually associated with a corresponding port $26_0$ ("Port 0") through $26_7$ ("Port 7") of the point-to-point switch 12 and are coupled thereto by means of a corresponding number of ESCON buses $24_0$ through $24_7$. Each of the ESCON buses 24 is capable of providing a bandwidth of up to 20 Mbytes/sec. in half duplex mode. Through use of the present invention (as an example only) eight ESCON channels (i.e. up to 160 Mbytes/sec. of data) may be multiplexed over a single Fibre Channel bus 14 provided no more than 106 Mbytes/sec. of "reads" or "writes" are presented at any one time. If this limit is exceeded, that is all eight commands were, for example, "reads", the effective ESCON traffic is then restricted to 106 Mbytes/sec. A local processor ("LP") 30 and associated memory buffer 28 is also associated with the port module 10 as will be more fully described hereinafter. The LP 30 is responsible for all Fibre Channel Basic Link Services, Extended Link Services, Error/Exception Processing and any non-FC-4 requirements.

Figure 2A:
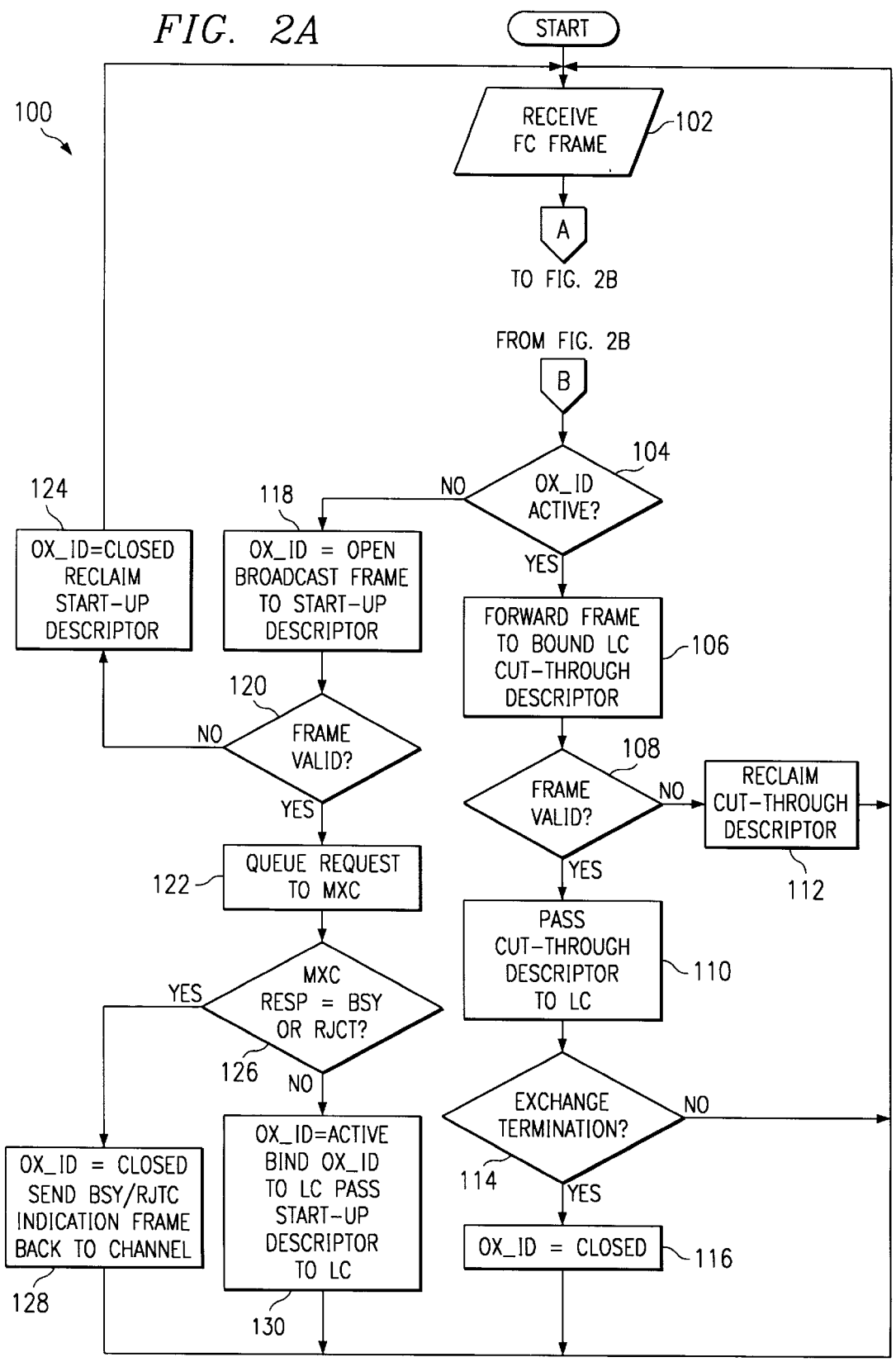
FIGS. 2A and 2B are a logic flow chart of the functionality of the port module of FIG. 1 illustrating the processing of Fibre Channel frames following FC-2 validation and the linking of the frame OX_ID to a particular link controller ("LC", or ESCON engine)
Figure 2B:
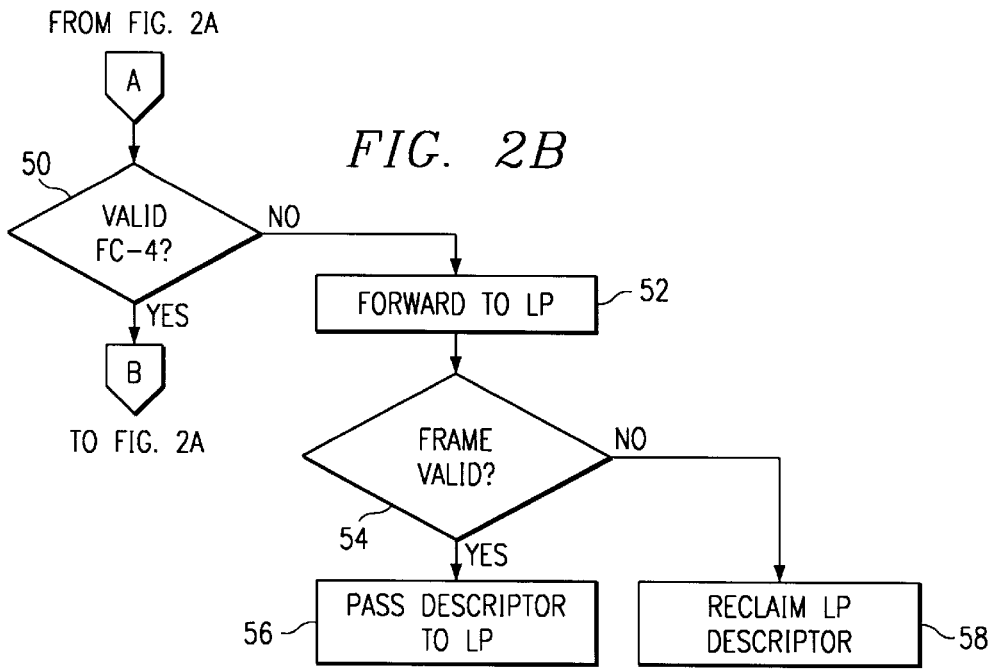

With reference additionally now to FIGS. 2A and 2B, the flow chart illustrated depicts the processing of frames received from the Fibre Channel. The starting point of the process 100 shown is assumed to be after the FC-2 frame header validation which may require a data structure access (i.e. active OX_ID table) entry such as SEQ_ID and SEQ_CNT validation for an "open" Exchange.

Following receipt of a Fibre Channel frame header at step 102, the process 100 proceeds to perform FC-4 processing at decision step 50 (FIG. 2B). If the frame header indicates an FC-4 frame, then the process 100 returns directly to decision step 104 (FIG. 2A). Otherwise, at step 52 the frame is forwarded to the LP 30 as the frame is an FC-2 extended or basic link service frame. At decision step 54, if the frame is valid, the descriptor is passed to the LP 30 at step 56, otherwise the LP 30 descriptor is reclaimed at step 58.

At decision step 104, an OX_ID look-up table, LUT, is used to identify if an Exchange is currently "active". (The FC-2 layer, through a common data structure in the TX_LUT, validates if an Exchange is "active". If it is, it compares the SEQ_CNT of the Exchange and the SEQ_ID of the received frame to the previously stored values for the OX_ID to determine if it is the next sequential frame of a sequence or a new sequence. If the Exchange is "active", then the process 100 proceeds to step 106 where a second look-up is performed to identify the link controller 22 (or ESCON engine) that is bound to that Exchange. (It should be noted that the process of decision step 104 and step 106 are actually performed in parallel but are illustrated as separate steps for sake of clarity.) This secondary check is also against the TX_LUT information to determine if, for example, if SEQ_CNT=N+1, SEQ_ID=the stored SEQ_ID etc. The received frame is then forwarded to that link controller 22 cut-through descriptor at step 106. At decision step 108, if the frame is not valid, the cut-through descriptor is reclaimed at step 112 and the process 100 returns to step 102. Alternatively, the process 100 proceeds to step 110 and the cut-through descriptor is passed to the bound link controller 22.

Each descriptor contains a complete sequence and ownership is only passed at the termination of the sequence. A buffer pointer is maintained within each cut-through descriptor for subsequent frames of a sequence.

At decision step 114, if the F_CTL field bits (19,20) indicate the last sequence of the Exchange (Exchange Termination) then the OX_ID is "closed" at step 116 and the binding between that OX_ID and the selected link controller 22 is released and the process 100 returns to step 102 to receive a Fibre Channel frame. If Exchange Termination is not determined at decision step 114, the process 100 updates the associated Look-Up Table ("LUT") entries SEQ_CNT, SEQ_ID, etc. and returns to receive the next Fibre Channel frame at step 102.

If at decision step 104 the OX_ID is not "active", then the process 100 proceeds to step 118 where the OX_ID is set to "open" and the frame is broadcast to the same start-up descriptor of all link controllers 22. At decision step 120, a determination is made as to whether or not the frame is valid. If it is, then a queue request is issued to the MXC at step 122. The ESCON link address of the device is extracted from a predetermined FC-4 header location within the FC-2 payload. If it is not valid, then at step 124, the OX_ID is "closed" and the start-up descriptor is reclaimed and the process 100 returns to step 102 to await the next frame.

If at decision step 126 the MXC 18 processing results in either a busy ("BSY" i.e. a destination busy "$DST_{13}$ BZ") or reject ("RJCT" i.e. a port reject "$PRT_{13}$ RJCT") condition then the process 100 proceeds to step 128 where the OX_ID is "closed" and a busy/reject indication frame is returned to the Fibre Channel with a return to step 102. Alternatively, if the MXC 18 response is neither a busy nor a reject condition, then the OX_ID is set to "active", the OX_ID is bound to a particular one of the link controllers $22_0$ through, as indicated by the MXC response, $22_7$ and the start-up descriptor is passed to that link controller 22 at step 130. The process then returns to step 102 to await the next Fibre Channel frame.

In operation, the apparatus and method of the present invention serves to guarantee in-order delivery of frames/sequences transmitted by a Fibre Channel Host (not shown) via the bus 14 to a particular one of the link controllers $22_0$ through $22_7$ through the "binding" of Exchange Identifiers to an individual link controller $22_0$ through $22_7$ as shown in FIG. 1. The port module 10 logically binds the OX_ID of received frames from the host channel to a given link controller $22_0$ through $22_7$. When a new Fibre Channel frame has been received by the port module 10, the OX_ID is copied from the frame header and presented to the Look-Up Table. It should be noted that the port module 10 actually performs various frame validations before actually using the OX_ID. The output of the LUT indicates the state of the OX_ID, as "opened" (i.e., FC-2 validated and MXC 18 bind pending), "active" (i.e., an active bind exists between the OX_ID and an LC 22 ) or "closed" (i.e., all other conditions). If the state is "active", the link controller $22_0$ through $22_7$ number to which this OX_ID is "bound" is also output by the LUT.

If the OX_ID of a new frame is currently in the "closed" state, then the LUT entry for this OX_ID is updated to reflect the "open" state. The frame is then forwarded to a start-up descriptor buffer as will be more fully described hereinafter. The FC-4 header of this frame is validated and the ESCON destination link address (ED_ID) is copied from the FC-4 header. If the FC-4 header checks validate, then a request is then issued to the MXC 18 using pre-initialized Port Number, Source Address, and the copied ED_ID. The MXC 18 processes the request as disclosed in the aforementioned patent application and returns the results back to the port module 10. If the results indicate either a connection has been established or a dialog-2 condition, the number of the particular one of the link controllers $22_0$ through $22_7$ is indicated as part of the results returned by MXC 18. The port module 10 then updates the LUT to indicate the "active" state and link controller 22 number bound to this OX_ID. The ownership of the start-up buffer (the initial frame is "broadcast" to the same start-up buffer in each of the buffer memories $20_0$ through $20_7$ of all link controllers $22_0$ through $22_7$ ) is then transferred to the appropriate link controller $22_0$ through 22.

The "active" state of an OX_ID and binding between a specific link controller 22 and the OX_ID remains intact until the F_CTL field (bits 19,20 ) of a received frame indicates the termination of that exchange. It is the responsibility of the host to close all exchanges it has "opened". The LP, however, has access to the TX_LUT and can perform exception processing when applicable. For exchanges that do not transition to the "active" state the host can transmit a no operation ("NOP") type of frame to close the exchange or close the exchange by some other means. The port module 10 must recognize this frame, close the LUT entry and can flush the frame or the exchange can be "closed" implicitly.

Detailed TX Frame/Sequence Processing in an
Exemplary Embodiment of the Present Invention With respect to the flowchart of FIG. 2 previously described and a particular exemplary implementation of the port module 10 of the present invention, the assumption is that the link is up and operational for the transmission of Fibre Channel frames, i.e. in the Fibre Channel "active" state. A basic assumption for any error type detected on FC-4 frames/sequences that are bound to a particular link controller 22 is that the descriptor is not passed to the link controller 22 until a sequence termination has been detected. Also the Fibre Channel front end ("FE") 16 is not responsible for detecting sequence timeout conditions.

A look-up table (LUT) is used to store various information regarding outbound Exchanges from the Fibre Channel. The following are the definitions for this information.

| | |
|---|---|
| LUT_ST | State of OX_ID. Three states have been defined, Closed, Open (MXC 18 request pending), and Active (Bind has been established) |
| LUT_BIND | Group Member (link controller 22) that the OX_ID has been bound to. |
| LUT_SEQ_ID | FC-2 Sequence_ID from the last frame received on this Exchange. |
| LUT_SEQ_FLG | This flag indicates whether a Sequence on this OX_ID is Active or Terminated. |
| LUT_SEQ_CNT | For multi-frame Sequences this is the last FC-2 Sequence Count received. |
| LUT_ERR | This flag indicates whether an error has been detected on the current Sequence. |

FC-2 Frame Validation Processing

Initially, the FE 16 validates that a Start of Frame ("SOF") delimiter type has been detected. Any SOF delimiter type other than a Class 3, SOFi3 or SOFn3, is forwarded to the LP 30. If the SOF is Class 3, then the FC-2 header must be processed. The FC-2 header checks then follow and may be sequential or the FC-2 header captured and performed in parallel. A R_CTL routing field check is performed and, if the routing control field is anything other than an FC-4 Device, bits 31:27=0x0, the frame is forwarded to the LP 30.

The D_ID and S_ID checks are then performed. The FE 16 validates the 24 bits of the D_ID against the Destination Address Register and the 24 bits of the S_ID against the Group Base Address registers. IF any miscompares are detected (including well known addresses), the frame is forwarded to the LP 30.

The remaining FC-2 header checks are performed thereafter. The Type field is tested against the FE 16 Type Register, the RX_ID against 0xFFFF, and the DF_CTL field against 0x00. If any of these checks fail, the frame is forwarded to the LP 30. If the OX_ID equals 0xFFFF, the frame is also forwarded to the LP 30. At this point, the FC-2 CRC is validated for the Frame. If a CRC error is detected, the buffer descriptor used is reclaimed by the FE 16 and the CRC error is logged. If the FC-2 CRC validates, the descriptor entry for that buffer is updated and ownership of the descriptor is passed to the LP 30. If a Fibre Channel frame passes all of the checks, the gate of being able to be forwarded to the LP 30 has been passed. Failure on any subsequent validity tests will result in the frame being flushed and the appropriate error logged.

FC-4 Start-up Exchange Frame/Sequence Validation Processing

The FC-4 validation includes the OX_ID being tested for an "active" state. If the OX_ID is not "active", a delimiter/F_CTL test is performed for a single frame, first sequence of a new Exchange. If this test fails, a secondary test is performed to determine if the frame is terminating an Exchange in response to a Busy/Rejected command frame. In either case, the frame is flushed but if the test fails, a delimiter error is logged in the FE 16.

If the test passes, the F_CTL field is validated against a mask value and the SEQ_CNT is set to 0. Failure of these tests logs a frame content error and the frame is flushed. If these checks pass, a test determines if the maximum number of outbound Exchanges have been exceeded. If the maximum number of outbound Exchanges has been exceeded, the error is logged and the frame is flushed. On the other hand, if the test is passed, the FC-2 payload is broadcast by the FE 16 to the next available start-up descriptor As the frame is being broadcast, the FC-4 header LRC is validated and failure of this check causes an LRC error to be logged, the frame gets flushed and the start-up descriptor buffer is reclaimed.

If the FC-2 CRC does not validate, the CRC error is logged, the frame is flushed and the FE 16 reclaims the start-up descriptor. If this test passes, the EOF delimiters are then tested for sequence termination. If the delimiter is not an EOFt, a delimiter error is logged, the frame is flushed and the start-up descriptor is reclaimed. If the delimiter is an EOFt, a bind request is issued to the Matrix Controller ("MXC 18"), a LUT entry is created for this OX_ID and the LUT_ST transitions to "open".

The results of the MXC 18 bind request are tested and if the bind could not be established, a FC-4 BSY/RJT single frame Exchange is generated and returned to the Fibre Channel, the LUT_ST of the OX_ID is changed from "open" to "closed" and the start-up descriptor is reclaimed by the FE 16. If a bind has been established, then the LUT control block entry is updated, the LUT_ST transitions to "active" and the start-up descriptor is updated and passed to the selected link controller 22 as indicated by the MXC response.

FC-4 Cut-Through Frame/Sequence Validation Process

After a bind has been established between an LC 22 and an OX_ID, all subsequent frames and sequences on that Exchange are validated for error conditions and forwarded through to the cut-through descriptor space for the duration of the Exchange. The cut-through descriptors operate as a set of circular ring buffers. The LUT contains several state information regarding the current state of a particular Exchange, such as whether any errors, LUT-ERR, have been detected, the Sequence ID, LUT_SEQ_ID, the Sequence Count, LUT_SEQ_CNT, of the last frame received and a flag, LUT_SEQ_FLG, indicating whether the Sequence ID is still active or terminated.

When a new frame is received and the OX_ID state is active, a test is performed on the start of frame delimiter and the F_CTL field of the frame against the LUT information. These tests provide checks to validate that the received frame is consistent with respect to the LUT information. If a new Exchange with the same OX_ID value is indicated and the LUT_ST is active, an error is reported in that the frame to terminate the Exchange was not received. If the frame indicates that it is a continuation of a sequence but the LUT_SEQ_FLG is not active, an error is detected indicating that the frame initiating the new sequence was not received. Likewise, if the frame and F_CTL field indicates a new sequence but the LUT_SEQ_FLG is active, then an error is detected indicating that the sequence terminating frame was not received. If the frame indicates an intermediate or terminating frame of a sequence and the LUT_SEQ_FLG is active, then the LUT_SEQ_ID is tested against the SEQ_ID field of the FC-2 header for consistency and an error is posted. A continuously incrementing SEQ_ID algorithm may be used for sequences consisting of multiple frames. If the SEQ_ID of the received frame is not "n+1" from the LUT_SEQ_CNT for intermediate or terminating frames of a sequence, then a missing frame error is reported. Any error detected during the processing of a sequence or a frame within a sequence is saved as part of the FC-4 Flags and sets the LUT_ERR flag in the absence of any frame FC-2 CRC errors.

Ownership of cut-through descriptors is indicated as part of the descriptor control field of a descriptor. During normal operations sequence size is negotiated such that each cut-through descriptor is sufficient in size to hold a complete sequence of frames. At the detection of sequence termination, the FE 16 passes ownership to the cut-through descriptor to the LC 22 and indicates any of the detected error conditions through the use of the FC-4 Flags. Also at sequence termination, the appropriate LUT information is also reset, i.e. LUT_SEQ_IF, LUT_SEQ_CNT, etc.

FE Frame/Sequence Generation

The FE 16 is responsible for FC-2 header creation for all link controller 22 sequences. Through a set of registers, the FE 16 is allocated a unique range of OX_ID and SEQ_ID values for each link controller 22. The link controller 22 provides an indication as part of the descriptor control field as to the initiation or termination of an Exchange and the R_CTL information category for each Sequence. With this information and a set of constants, i.e. RX_ID, Type, CS_CTL, and the like, the FE 16 is able to generate the FC-2 header information. The following describes how the FE 16 can produce the various fields of the FC-2 header.

| | |
|---|---|
| SOF Type | SOF3i for the first frame of a Sequence, SOF3n for all subsequent frames of that Sequence. |
| R_CTL (31:28) | |
| R_CTL (27:24) | Initialized in the descriptor control field. |
| R_CTL (31:24) | |
| D_ID | Initialized as a part of the FE 16 register set. |
| CS_CTL | Fixed. |
| S_ID | Initialized as a part of the FE 16 register set. |

-continued

| | |
|---|---|
| TYPE | The value in the FE 16 Type register is used for all frames. |
| F_CTL (23:22) | Fixed. |
| F_CTL (21:19) | Calculated based off of IU_CTL and Byte Count values from the buffer descriptor. |
| F_CTL (18:0) | Fixed. |
| SEQ_ID | The LP 30 through initialization of FE 16 registers provides a unique range of SEQ_IDs for each link controller 22. These values continuously increment and can wrap. |
| DF_CTL | Fixed. |
| SEQ_CNT | The SEQ_CNT for the first frame of each Sequence always starts at zero and increments for each additional frame of that Sequence. |
| OX_ID | The LP 30 through initialization of FE 16 registers provides a unique range OX_IDs for each link controller 22. These values continuously increment and can wrap. 0xFFFF is invalid and is not used as an OX_ID value. |
| RX_ID | Fixed. |
| Parameter | Fixed. |
| EOF Type | Based off o the number of frames required to be transmitted for each descriptor. For the last frame of a sequence EOFt is transmitted, otherwise, EOFn is used for all other frames of the Sequence. |

When the FE 16 has detected ownership of a buffer descriptor, it creates the FC-2 header information as previously described. A test is made for the availability of the Frame Generator RX_FG. When the RX_FG becomes available, the FE 16 forwards the first frame of the FC Sequence for transmission. If the byte count of the Sequence requires multiple frames, the FE 16 waits for the RX_FG to complete the transmission of the current frame and then immediately forwards the next frame, until Sequence termination. At Sequence termination, the FE 16 again begins polling the current buffer descriptor of the next enabled ring.

Figure 3:
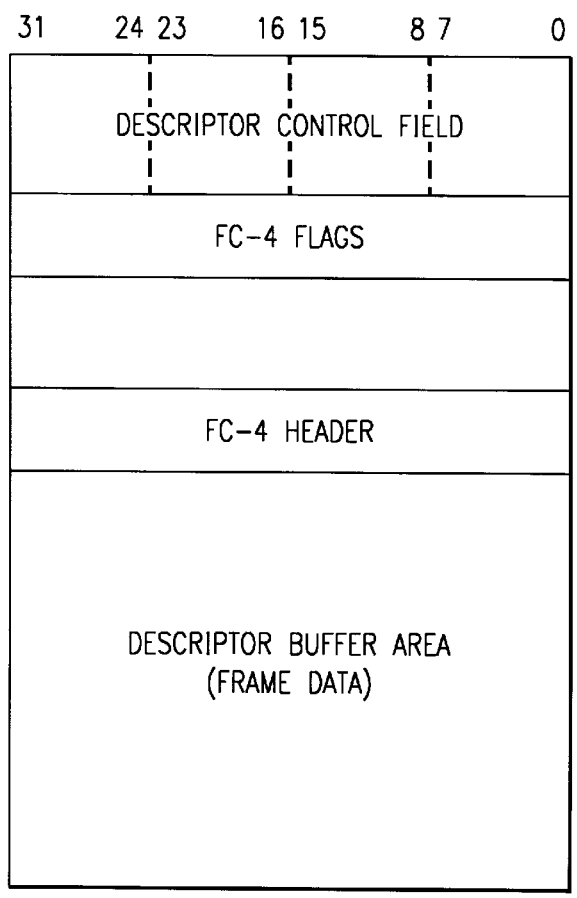
FIG. 3 is a representative buffer descriptor format for the memory devices (for example 32K×36 memories) associated with each of the link controllers of the port module.

With reference additionally now to FIG. 3, the RX/TX buffer descriptor format for a representative one of the memory devices 20 is shown comprising a Descriptor Control Field, FC-4 Flags, FC-4 Header and Descriptor Buffer Area (Frame Data) regions. Each link controller 22 has an associated individual memory device which may be furnished as a 32K×36 integrated circuit memory device, for each receive ("RX") and transmit ("TX") buffer descriptor area which are viewed by the link controller 22 as a single contiguous address space. The FE 16 views this memory as individual RX and TX memory regions. In the embodiment illustrated, the address format is byte oriented and parity is implied on a per byte basis.

The Fibre Channel frame information is the point of reference for these buffers. That is, the TX buffers contain outbound data that has been transmitted by a Fibre Channel Host while the RX buffers contain inbound data that is received by the Fibre Channel Host.

Descriptor Control

Word 0 of each descriptor is the Descriptor Control (DESC_CTL) which provides the mechanism for transferring ownership of a particular buffer descriptor. The local processor ("LP") 30 is responsible for proper setting of the ownership bits in all of these buffer descriptors at initialization. During error recovery actions or LC updates, the link controller 22 is responsible for proper lean up and initialization of these descriptors as the LP 30 has no access mechanism to the link controller 22 descriptor memory while the Fibre Channel Link is operational. After initialization, the link controllers 22 "own" all of the RX buffer descriptors and the Fibre Channel front end ("FE") 16 "owns" all of the TX buffer descriptors. Various control and information is included within this field such as the algorithm for setting bits to pass ownership, the amount of data associated with payload for this descriptor and other control-type information.

FC-4 Flags

The FC-4 Flags field, word 1, is used only by the FE 16 for the TX buffer descriptors to indicate various FE 16 detected error conditions, as previously described.

FC-4 Header

The FC-4 header is used to store information that can describe attributes associated with the payload.

Payload Area

The Payload Buffer area of the buffer descriptor contains the FC-4 level user data to be sent/received between the Fibre Channel Host and LP 30/link controllers 22.

Figure 4:
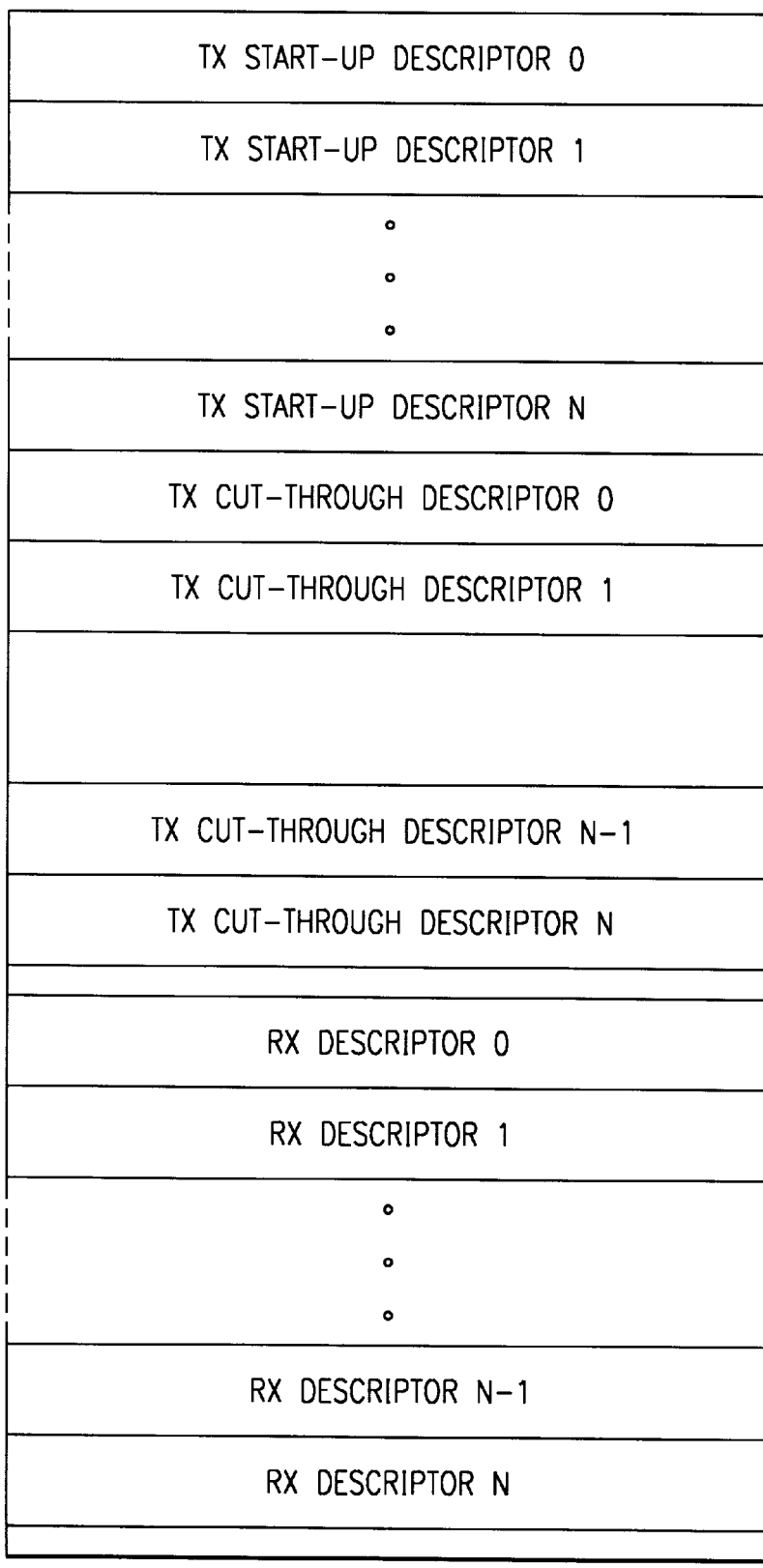
FIG. 4 depicts a representative buffer descriptor memory map as viewed by an individual link controller.

With reference additionally now to FIG. 4, the buffer descriptor memory map is depicted as viewed by an individual link controller 22. The buffer descriptor memory has a number of TX Start-up Descriptors 0 through N, a number of TX Cut-Through Descriptors 0 through N and a number of RX Descriptors 0 through N wherein N may be a different number in each instance as selected for the particular design.

On the TX side (outbound from the Fibre Channel) this format allows for up to, in the particular exemplary implementation shown, eight single frame exchange start-up sequences to be issued. However, the descriptor size is identical to the cut-through descriptors.

When the link controller 22 is in an "idle" state, it polls the Descriptor Control ("DESC_CTL") field of the Start-up Descriptor 0 testing for ownership. A pointer to the start-up descriptor "owned" by this link controller 22 is included in the Descriptor Control field. The pointer address is byte oriented, word aligned (i.e. bits 10 have a value of b'00). The remaining descriptor information is included in word 0 of the start-up descriptor owned.

After the link controller 22 has operated on the start-up descriptor it then begins to poll the DESC_CTL field of its current TX cut-through descriptor for its next TX sequence from the Fibre Channel. When the link controller 22 begins to operate on the cut-through descriptors it does so in a circular fashion, i.e. it uses the next sequential cut-through descriptor and wraps back to TX cut-through descriptor 0 after operating on TX cut-through descriptor 21. When the link controller transitions back to an "idle" state, it again begins to poll the first word of start-up descriptor 0 for ownership.

The link controller 22 and LP 30 operate on the RX descriptor list as a circular ring of buffers. The FE 16 polls all of the RX descriptor rings in a "round robin" fashion testing for ownership of an RX descriptor. When ownership has been detected, the FE 16 transmits that descriptor inbound to the Fibre Channel and continues its round robin poll. After initialization or any error recovery actions on a particular link controller 22 or an software update to the link controller 22, the FE 16 resets its TX and RX cut-through descriptor pointers associated with that particular link controller 22 to the first cut-through descriptor.

While there have been described above the principles of the present invention in conjunction with a specific system architecture and frame processing method, it-is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A port module comprising:
   a plurality of link controllers, each of said link controllers coupled to one of a plurality of data ports;
   a plurality of buffer memories, each of said buffer memories coupled to one of said link controllers;
   a data channel; and
   a front end portion of said port module coupled to said data channel and operative in association with a matrix controller for identifying a start up exchange for a first of a plurality of data frames on said data channel, said front end portion directing said first of said plurality of data frames to a first portion of one of said plurality of buffer memories and directing all subsequent ones of said plurality of data frames to a second portion said one of said plurality of buffer memories, said one of said plurality of buffer memories being associated with one of said link controllers, and said one of said link controllers being associated with a selected one of said plurality of data ports as specified by said matrix controller.

2. The port module of claim 1 wherein said plurality of data ports comprise ESCON ports.

3. The port module of claim 2 comprising eight ESCON ports.

4. The port module of claim 4 wherein said data channel is a Fibre Channel.

5. The port module of claim 4 wherein said start up exchange is indicated by an Originator Exchange Identifier for said plurality of data frames.

6. The port module of claim 1 wherein said first portion of said one of said buffer memories comprises a start-up descriptor portion.

7. The port module of claim 1 wherein said second portion of said one of said plurality of buffer memories comprises a cut-through descriptor portion.

8. The port module of claim 1 wherein said plurality of link controllers are operative to convert a format of said plurality of data frames from Fibre Channel to ESCON.

9. The port module of claim 8 wherein said plurality of link controllers are further operative to convert said format of said plurality of data frames from ESCON to Fibre Channel.

10. The port module of claim 1 wherein said plurality of data ports comprise bidirectional ports of an ESCON cross point switch.

11. Apparatus operable to multiplex a plurality N of ESCON channels over a single fibre channel connection, to thereby take advantage of a higher bandwidth of said fibre channel connection, comprising:
    a plurality N of link controllers, each of said link controllers coupled to one of said plurality N of ESCON channels;
    a plurality N of buffer memories, each of said buffer memories coupled to-one of said plurality N of link controllers;
    a front end portion coupled intermediate said single fibre channel connection and each of said plurality N of buffer memories;
    a matrix controller coupled to said front end portion;
    said matrix controller for identifying a start up exchange specified by a first of a plurality of data frames received on said fibre channel connection;
    said front end portion responsive to said matrix controller for directing said first of said plurality of data frames to a first portion of one of said plurality of buffer memories as specified by said start up exchange; and
    said front end portion for binding all subsequent ones of said plurality of data frames to a second portion said one of said plurality of buffer memories.

* * * * *